(12) United States Patent
Miyazaki et al.

(10) Patent No.: US 8,308,306 B2
(45) Date of Patent: Nov. 13, 2012

(54) LIGHT SOURCE UNIT UTILIZING LASER FOR LIGHT SOURCE AND PROJECTOR

(75) Inventors: Takeshi Miyazaki, Fussa (JP); Masahiro Ogawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 324 days.

(21) Appl. No.: 12/825,579

(22) Filed: Jun. 29, 2010

(65) Prior Publication Data

US 2010/0328625 A1 Dec. 30, 2010

(30) Foreign Application Priority Data

Jun. 30, 2009 (JP) ................................ 2009-155452

(51) Int. Cl.
*G03B 21/14* (2006.01)
*G03B 21/20* (2006.01)
*G03B 21/00* (2006.01)

(52) U.S. Cl. ................ 353/84; 353/31; 353/85
(58) Field of Classification Search ................ 359/885, 359/890, 892, 884, 722, 723; 353/85, 30, 353/31, 94, 122, 84; 362/84, 800, 260, 259; 352/41, 42; 250/226, 483.1, 484.2, 484.4, 250/486.1, 487.1; 315/313, 315, 291, 294, 315/297, 307

See application file for complete search history.

(56) References Cited

U.S. PATENT DOCUMENTS

| | | | | |
|---|---|---|---|---|
| 5,868,482 | A | * | 2/1999 | Edlinger et al. ............. 353/84 |
| 7,871,168 | B2 | * | 1/2011 | Liu et al. ..................... 353/84 |
| 2007/0230179 | A1 | | 10/2007 | Ripoll et al. |
| 2009/0034284 | A1 | | 2/2009 | Li et al. |
| 2010/0309439 | A1 | | 12/2010 | Bi et al. |

FOREIGN PATENT DOCUMENTS

CA    2705863 A1    6/2009

(Continued)

OTHER PUBLICATIONS

Chinese Office Action dated Sep. 13, 2011 (and English translation thereof) in counterpart Chinese Application No. 201010221400.7.

(Continued)

*Primary Examiner* — Que T Le
*Assistant Examiner* — Pascal M. Bui-Pho
(74) *Attorney, Agent, or Firm* — Holtz, Holtz, Goodman & Chick, PC

(57) ABSTRACT

A light source unit includes a light emitting plate which has a plurality of segment areas and in which a luminescent material layer which emits light having a predetermined wavelength band by receiving excitation light and a transmissive portion which transmits light are formed on at least the plurality of segment areas, a primary light source for emitting excitation light on to the luminescent material, a secondary light source for emitting light having a wavelength band which differs from those of luminescent light emitted from the luminescent material layer and excitation light emitted from the primary light source, a light guiding optical system for guiding light emitted from the light emitting plate and light emitted from the secondary light source to the same optical path, and a light source control means for controlling the emission of light from the primary light source and the secondary light source.

20 Claims, 10 Drawing Sheets

FOREIGN PATENT DOCUMENTS

| | | |
|---|---|---|
| CN | 101592308 A | 12/2009 |
| JP | 2003-233123 A | 8/2003 |
| JP | 2004-325874 A | 11/2004 |
| JP | 2004-341105 A | 12/2004 |
| JP | 2006-301114 A | 11/2006 |
| JP | 2007-156270 A | 6/2007 |
| JP | 2007-218956 A | 8/2007 |
| JP | 2008-052070 A | 3/2008 |
| JP | 2008-058558 A | 3/2008 |

OTHER PUBLICATIONS

Japanese Office Action (Notification of Reasons for Refusal) dated Jan. 6, 2011 (and English translation thereof) in counterpart Japanese Application No. 2009-155452.

Korean Office Action dated Feb. 27, 2012 (and English translation thereof) in counterpart Korean Application No. 10-2010-0062573.

Japanese Office Action dated Feb. 24, 2011 (and English translation thereof) in counterpart Japanese Application No. 2009-155452.

* cited by examiner

FIG. 7A

| WHEEL ANGLE [°] | 60 180 300 60 180 300 60 180 300 |
|---|---|
| EMITTED LIGHT | G B R G B R G B |
| PRIMARY LIGHT SOURCE | ON/OFF waveform |
| SECONDARY LIGHT SOURCE | ON/OFF waveform |

FIG. 7B

| WHEEL ANGLE [°] | 60 180 300 60 180 300 60 180 300 |
|---|---|
| EMITTED LIGHT | G B M R Y G B M R Y G B M |
| PRIMARY LIGHT SOURCE | ON/OFF waveform |
| SECONDARY LIGHT SOURCE | ON/OFF waveform |

FIG. 7C

| WHEEL ANGLE [°] | 60 180 300 60 180 300 60 180 300 |
|---|---|
| EMITTED LIGHT | G B R G B R G B |
| PRIMARY LIGHT SOURCE | ON/OFF waveform |
| SECONDARY LIGHT SOURCE | ON/OFF waveform |

LIGHT SOURCE UNIT UTILIZING LASER FOR LIGHT SOURCE AND PROJECTOR

CROSS-REFERENCE TO RELATED APPLICATIONS

This application is based upon and claims the benefit of priority under 35 USC 119 of Japanese Patent Application No. 2009-155452 filed on Jun. 30, 2009, the entire disclosure of which, including the description, claims, drawings and abstract thereof, is incorporated herein by reference.

BACKGROUND OF THE INVENTION

1. Field of the Invention

The present invention relates to a light source unit which utilizes laser for a light source and a projector which includes the light source unit.

2. Description of the Related Art

In these days, data projectors are used in many cases as image projection apparatuses which project images including video images shown on screens of personal computers on to a screen, and the data projectors further read out image data or dynamic image data stored in memory cards for projection on to the screen. These projectors are such that light emitted from a light source is concentrated on a micromirror device called a DMD (Digital Micromirror Device) or a liquid crystal plate for display of a color image on the screen.

In projectors of the type described above, conventionally, projectors using a high-intensity discharge lamp as a light source have been the mainstream of projectors. In recent years, however, there have been made many developments and proposals on light source units which utilize as a light source a light emitting diode or a laser diode, or devices utilizing organic EL technology or luminescence technology using luminescent materials. For example, a light source unit described in Japanese Unexamined Patent Publication No. 2004-341105 (JP-A-2004-341105) includes a luminescent wheel which is made up of a disc-shaped transparent base material on which a luminescent material layer is disposed and a solid-state light source which emits ultraviolet light, and the luminescent wheel is described as converting ultraviolet light received into visible light. In the light source unit described in JP-A-2004-341105, ultraviolet light is shone on to the luminescent material layer formed on the luminescent wheel as excitation light, so that luminescent light having red, green and blue wavelength bands can be emitted.

However, since the light emitting efficiency of the red luminescent material is remarkably lower than those of the other luminescent materials, there has been caused a problem that the luminance of red becomes insufficient.

SUMMARY OF THE INVENTION

The invention has been made in view of the problem inherent in the related art and an object thereof is to provide a light source unit including a luminescent wheel having a luminescent material of a kind having a good light emitting efficiency, a light source for exciting the luminescent material, and a single-color light source for emitting light having a corresponding wavelength band to a luminescent material of a kind having a relatively low light emitting efficiency to thereby increase a luminance of a screen, and a projector including this light source.

According to a preferred aspect of the invention, there is provided a light source unit including:

a light emitting plate which has a plurality of segment areas and in which a luminescent material layer which emits light having a predetermined wavelength band by receiving excitation light and a transmissive portion which transmits light are formed on at least the plurality of segment areas;

a primary light source for emitting excitation light on to the luminescent material;

a secondary light source for emitting light having a wavelength band which differs from those of luminescent light emitted from the luminescent material layer and excitation light emitted from the primary light source;

a light guiding optical system for guiding light emitted from the light emitting plate and light emitted from the secondary light source to the same optical path; and a light source control means for controlling the emission of light from the primary light source and the secondary light source.

Namely, the light source unit is provided which can emit highly luminous light of a plurality of colors, and the light source unit can emit such light while time-sharing the plurality of colors. Then, by making the light source unit into a light source unit which emits at least light of the three primary colors, the resulting light source unit can be suitable for optical equipment such as a projector.

In addition, according to another preferred aspect of the invention, there is provided a projector having the light source unit described above. By being equipped with the light source unit, although it is small in size, the projector can be made into a projector which can project an image which is bright and superior in tone.

BRIEF DESCRIPTION OF THE DRAWINGS

The above and further objects, characteristics and advantages of the invention will be more obvious from accompanying drawings and the following detailed description of the invention. In the drawings, FIG. 7 shows time charts depicting timings at which a primary light source and a secondary light source are turned on and off by a light source control means according to the embodiment of the invention.

DETAILED DESCRIPTION OF THE PREFERRED EMBODIMENT

Figure 1:
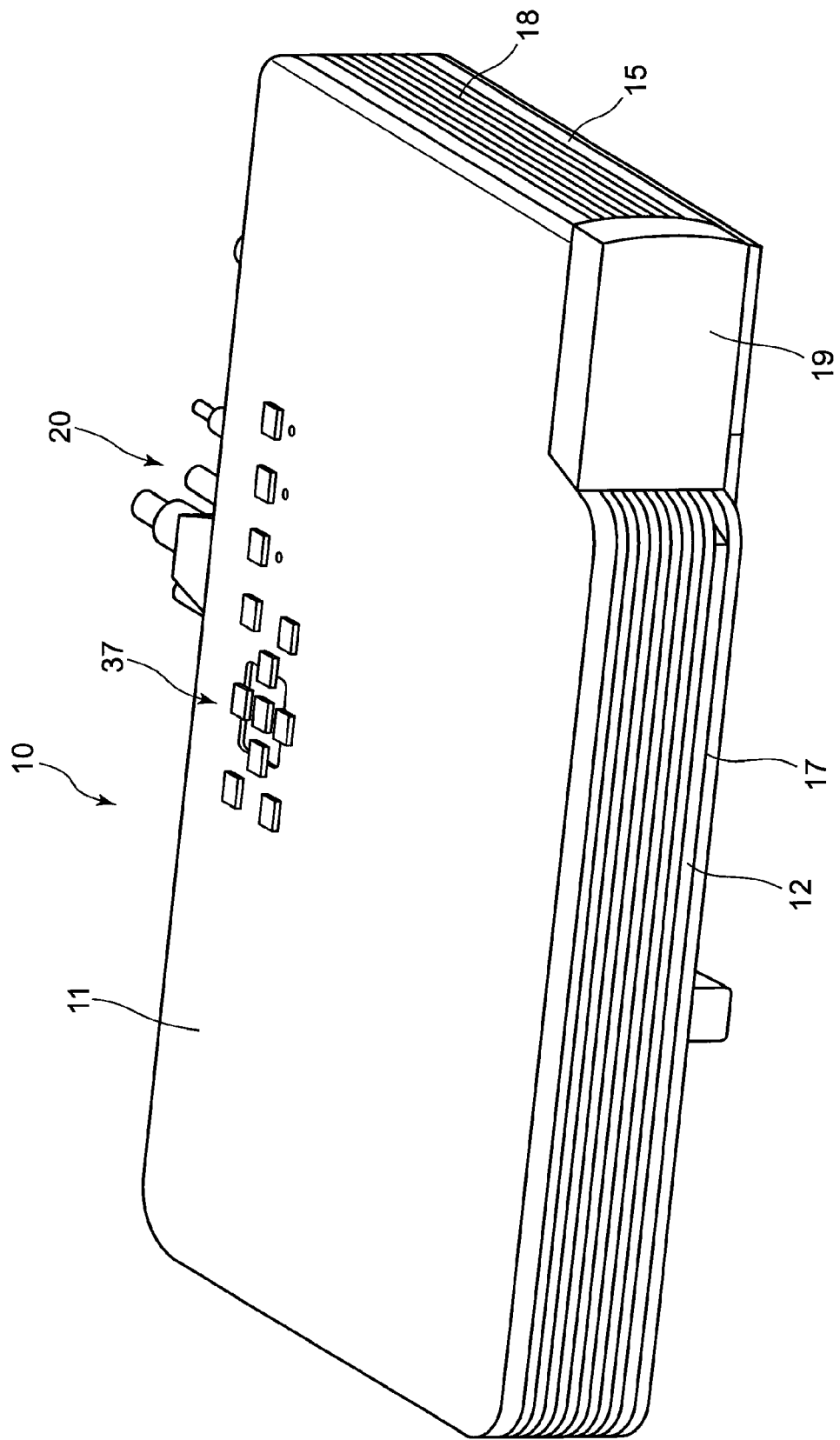
FIG. 1 is a perspective view showing an external appearance of a projector which includes a light source unit according to an embodiment of the invention.

Hereinafter, a best mode for carrying out the invention will be described by use of the accompanying drawings. However, in the following embodiment, although various preferred technical limitations will be described as being made for carrying out the invention, the scope of the invention is not limited at all to the following embodiment and illustrated examples.

Firstly, the configurations of a projector of the invention and a light source unit which is incorporated in the projector will be summarized.

A projector 10 includes a light source unit 63, a display device 51, a cooling fan, a light source side optical system 62 for guiding light from the light source unit 63 to the display device 51, a projection side optical system 90 for projecting an image emitted from the display device 51 on to a screen, a projector control means for controlling the light source unit 63 and the display device 51, and a light source control circuit 41 which is a light source control means for controlling timings at which a primary light source 72 and a secondary light source 82 of the light source unit 63 are turned on.

Then, in the light source unit 63, a dichroic mirror 151 is disposed in a position where an optical axis of the primary light source unit 72 and an optical axis of the secondary light source unit 82 intersect each other. This dichroic mirror 151 transmits light from the primary light source 72 which has passed through a luminescent wheel 71 and luminescent light emitted from the luminescent wheel 71 and reflects light from the secondary light source 82. This dichroic mirror 151 prevents light from the secondary light source 82 from entering the luminescent wheel 71.

This light source unit 63 includes the luminescent wheel 71 which has two semicircular segment areas lying adjacent to each other on a transparent base material whose rotation can be controlled and in which a luminescent material layer 131 which emits light having a green wavelength band by receiving excitation light is formed in a first area 1 which is one of the segment areas and a transmissive portion which transmits light is formed in a second area 2 which is the other segment area, the primary light source 72 for emitting excitation light in a visible light wavelength band on to the luminescent material, the secondary light source 82 for emitting light having a wavelength band which differs from those of luminescent light emitted from the luminescent material layer 131 and excitation light emitted from the primary light source 72, and a light guiding optical system for guiding light emitted from the luminescent wheel 71 and light emitted from the secondary light source 82 to the same optical path.

In addition, the transparent base material is formed of a glass base material or a transparent resin base material. A dichroic layer 132 is formed on a surface of the first area 1 of the transparent base material on which the luminescent material layer 131 is to be disposed through coating. This dichroic layer 132 transmits excitation light but reflects light having other wavelength bands.

Additionally, a diffuse layer 141 is formed on the second area 2 of the transparent base material, and this diffuse layer 141 diffuses light which is transmitted therethrough. Further, a nonreflective coated layer is formed through coating over an overall surface of a side of the transparent base material which is opposite to the side on which the luminescent layer 131 is disposed.

In addition, the primary light source 72 is a laser emitter which emits light which has a blue wavelength band and whose wavelength is shorter than that of light having a green wavelength band and emitted from the green luminescent material layer 131. The secondary light source 82 is a light emitting diode which emits light of a red wavelength band.

Additionally, the light source control means is configured so as to turn off the primary light source 72 and turn on the secondary light source 82 so as to prevent the emission of light having a wavelength band which is a combination of wavelength bands of two colors from the luminescent wheel 71, which would otherwise occur by light from the primary light source 72 entering so that an illumination area 7 stretches over the first area 1 and the second area 2 at a boundary between the two segment areas.

Hereinafter, an embodiment of the invention will be described by reference to the accompanying drawings.

FIG. 1 is a perspective view showing an external appearance of a projector 10. In this embodiment, left and right denote, respectively, left and right directions with respect to a projecting direction of the projector 10, and front and rear denote, respectively, front and rear directions with respect to a traveling direction of a light beam emitted from the projector 10. As is shown in FIG. 1, the projector 10 has a substantially rectangular parallelepiped shape and has a lens cover 19 which covers a projection port which lies to a side of a front panel 12 which is referred to as a front side panel of a main body case, as well as a plurality of inside air outlet holes 17 in the front panel 12. Further, although not shown, the projector 10 includes an Ir reception part for receiving a control signal from a remote controller.

In addition, a keys/indicators part 37 is provided on an upper side panel 11 which makes up the main body case. Disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side or a back side panel of the main body case are an input/output connectors part where USB terminals, an image signal input D-SUB terminal, an S terminal, an RCA terminal and the like are provided and various types of terminals 20 including a power supply adaptor plug and the like. A plurality of outside air inlet holes 18 are formed in proximity to lower portions of a right-hand side panel 14 which constitutes a side panel, not shown, of the main body case and a left-hand side panel 15 which is a side panel shown in FIG. 1.

Figure 2:
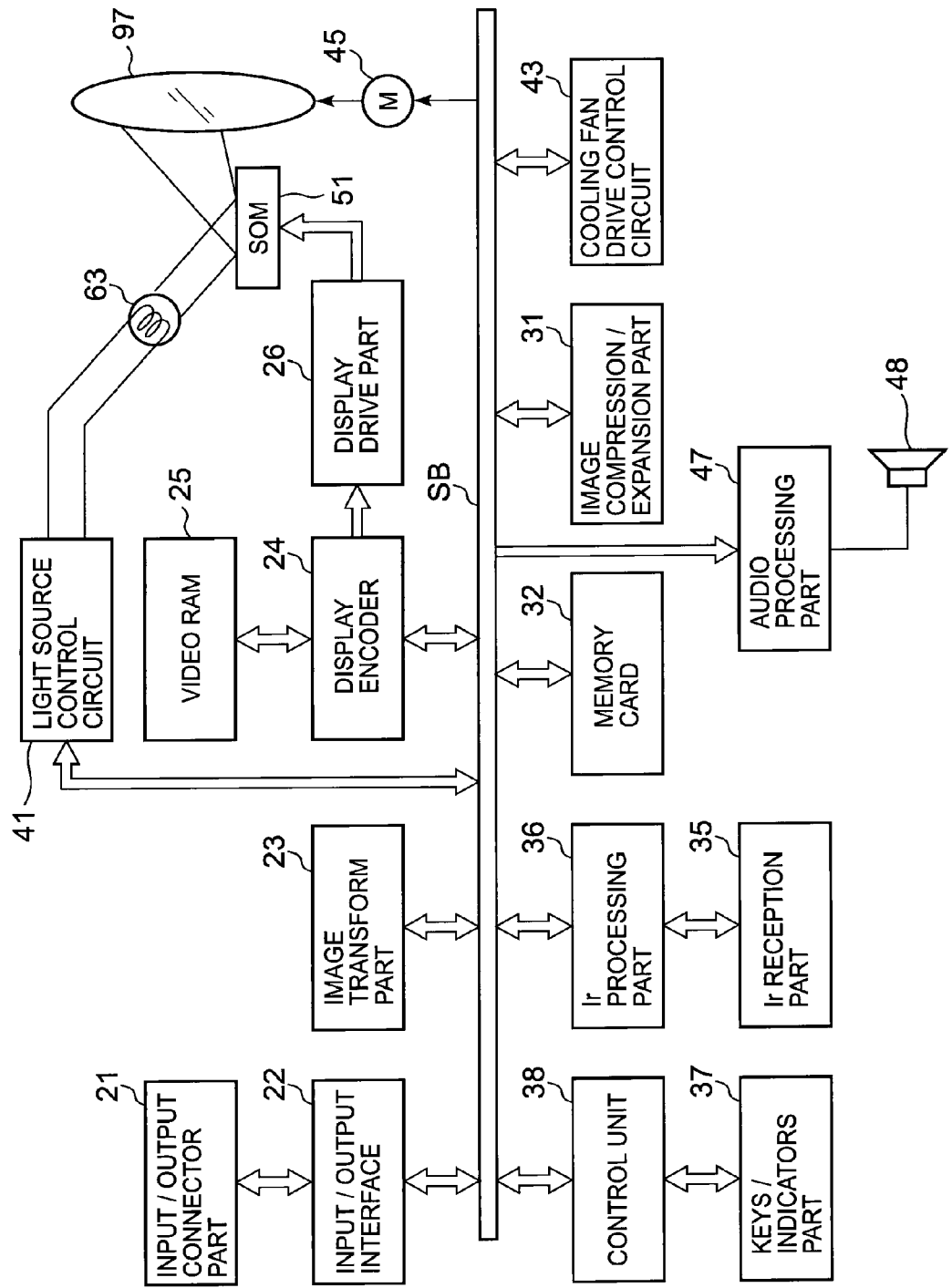
FIG. 2 is a functional circuit block diagram of the projector which includes the light source unit according to the embodiment of the invention.

Next, a projector control means for the projector 10 will be described by use of a block diagram in FIG. 2.

The projector control means is made up of a control unit 38, an input/output interface 22, an image transform part 23, a display encoder 24, a display drive part 26 and the like. Image signals of various standards that are inputted from the input/output connector part 21 are sent via the input/output interface 22 and a system bus (SB) to the image transform part 23 where the image signals are transformed so as to be unified into an image signal of a predetermined format which is suitable for display. Thereafter, the image signals so transformed are then outputted to the display encoder 24.

The control unit 38 governs the control of respective operations of circuitries within the projector 10 and is made up of a CPU, a ROM which stores in a fixed fashion operation programs of various types of settings and a RAM which is used as a work memory.

In addition, the display encoder 24 deploys the image signals inputted thereinto on a video RAM 25 for storage therein and generates a video signal from the contents stored in the video RAM 25, outputting the video signal so generated to the display drive part 26.

The display drive part 26 drives a display device 51 which is a spatial optical modulator (SOM) at an appropriate frame rate in accordance with the image signal outputted from the display encoder 24. Namely, a light beam emitted from the light source unit 63 is caused to be incident on the display device 51 via a light source side optical system to thereby form an optical image by reflected light reflected at the display device 51. Then, the image so formed is projected on to a screen, not shown, for display via a projection system lens group which is referred to as a projection side optical system. A movable lens group 97 of the projection side optical system is driven by a lens motor 45 for zooming or focusing.

In addition, an image compression/expansion part 31 performs a recording operation in which a luminance signal and a color-difference signal of the image signal are data compressed through processings such as ADCT and Huffman coding so as to write them sequentially on a memory card 32 which is referred to as a detachable recording medium. Further, the image compression/expansion part 31 performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transform part 23 so as to enable the display of dynamic images on the basis of the image data stored on the memory card 32.

Operation signals generated at the keys/indicators part 37 which is made up of the main keys and indicators provided on the upper side panel 11 of the main body case are sent out directly to the control unit 38, while key operation signals generated by operating keys on the remote controller are received by the Ir reception part 35, and a code signal demodulated at an Ir processing part 36 is outputted to the control unit 38.

In addition, a voice processing part 47 is connected to the control unit 38 via the system bus (SB). This voice processing part 47 includes a sound source circuit such as a PCM sound source. When in a projection mode and a reproducing mode, the voice processing part 47 converts voice data into analog signals and drives a speaker 48 to output loudly sound or voice based on the voice data.

Additionally, the control unit 38 controls a light source control circuit 41 which is the light source control means. This light source control circuit 41 controls the emission of light from the primary light source and the secondary light source of the light source unit 63 in accordance with an image signal. Further, the control unit 38 causes a cooling fan drive control circuit 43 to detect temperatures through a plurality of sensors which are provided at the light source unit 63 and the like so as to control the rotational speed of the cooling fan based on the results of the temperature detection.

In addition, the control unit 38 also causes the cooling fan drive control circuit 43 to make the cooling fan continue to rotate even after the power supply of the projector main body is switched off by use of a timer or the like or to make the power supply to the projector main body be cut off depending upon the results of the temperature detection by the temperature sensors.

Next, an internal construction of the projector 10 will be described.

Figure 3:
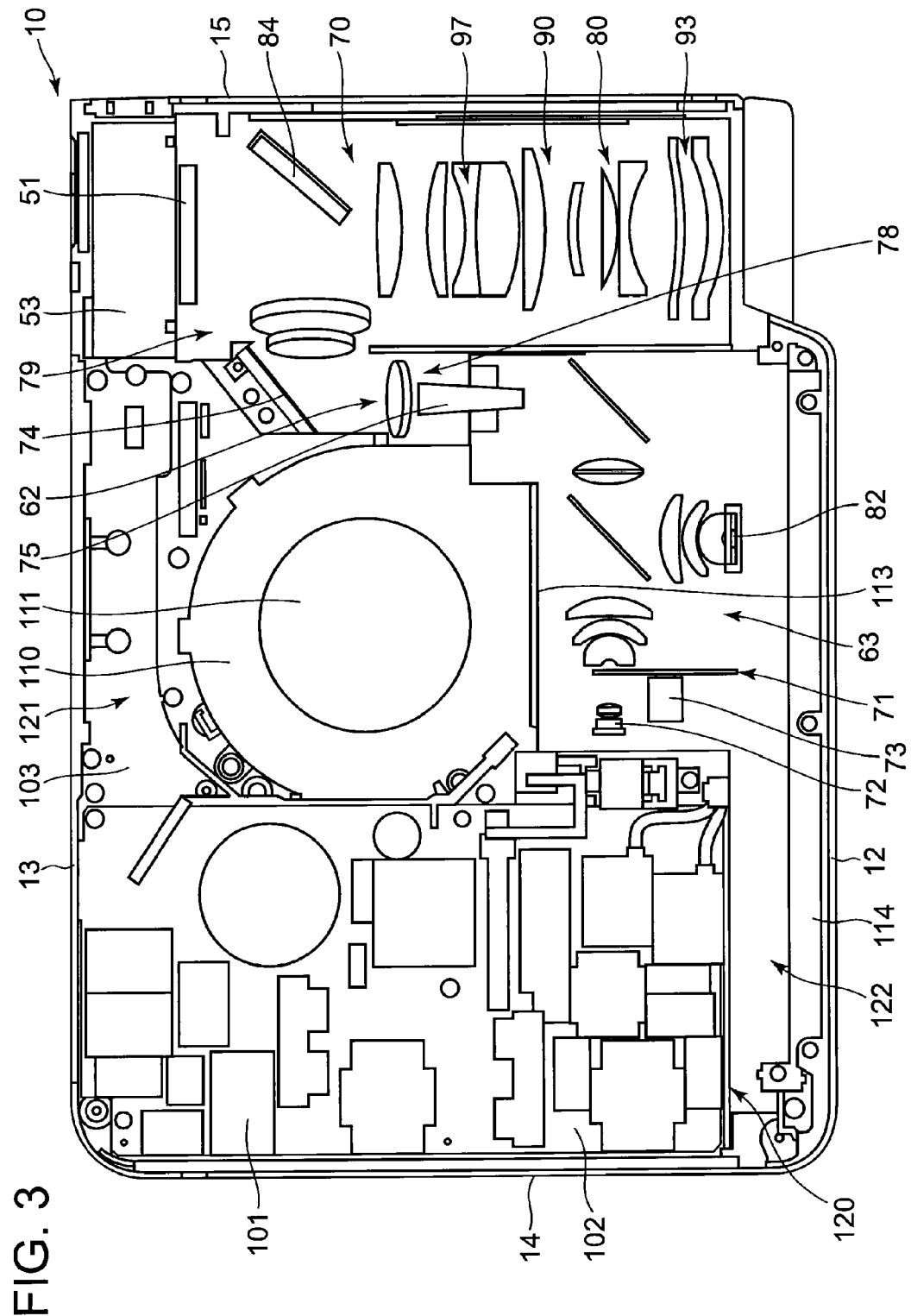
FIG. 3 is an exemplary plan view showing an internal construction of the projector includes the light source unit according to the embodiment of the invention.

FIG. 3 is an exemplary plan view showing an internal construction of the projector 10.

As is shown in FIG. 3, in the projector 10, a light source control circuit board 102 is disposed in proximity to the right-hand side panel 14 and a power supply circuit block 101 and the like are mounted on this light source control circuit board 12. A sirocco fan-type blower 110 is disposed substantially at a center in the projector 10. In addition, a control circuit board 103 is disposed in proximity to the blower 110, and the light source 63 is disposed in proximity to the front panel 12, an optical system unit 70 being disposed in proximity to the left-hand side panel 15. Additionally, an interior of a housing of the projector 10 is divided airtightly into an inlet side space compartment 121 which lies on the back panel 13 side and an outlet side space compartment 122 which lies on the front panel 12 side by a portioning bulkhead 120. The blower 110 is disposed so that its outside air inlet port 111 is positioned in the inlet side space compartment 121 and its outside air outlet port 113 is positioned on a boundary between the outlet side space compartment 122 and the inlet side space compartment 121.

The optical system unit 70 has a substantially U-shape and is made up of three blocks such as an illumination side block 78 which is positioned in proximity to the light source unit 63, an image generation block 79 which is positioned on the back panel 13 side, and a projection side block 80 which is positioned between the illumination side block 78 and the left-hand side panel 15.

The illumination side block 78 includes part of a light source side optical system 62 for guiding light emitted from the light source unit 63 to the display device 51 which is included in the image generation block 79. A light mixing unit 75 for making a light beam emitted from the light source 63 into a light beam whose intensity is uniformly distributed and a light guiding lens for concentrating light that has passed through the light mixing unit 75 are included in the light source side optical system 62 that is included in the illumination side block 78.

The image generating block 79 has, as the light source side optical system 62, an optical axis varying mirror 74 for varying a direction of an optical axis of the light beam that has emerged from the light mixing unit 75, a plurality of light guiding lenses for concentrating light reflected by the optical axis varying mirror 74 on the display device 51 and a shining mirror 84 for shining the light beam that has passed through the light guiding lenses on to the display device 51 at a predetermined angle. Further, the image generating block 79 includes a DMD which is configured as the display device 51, and a display device heatsink or cooling device 53 for cooling the display device 51 is disposed on a back panel 13 side of the display device 51 to thereby prevent the display device 51 from being heated to a high temperature.

The projection side block 80 has a lens group of a projection side optical system 90 which projects light on to the screen, which light is reflected by the display device 51 to form an image. The projection side optical system 90 constitutes a variable focus lens made up of a fixed lens group 93 which is incorporated in a fixed lens barrel and a movable lens group 97 which is incorporated in a movable lens barrel and having a zooming function. This variable focus lens enables zooming and focusing operations by moving the movable lens group 97 by a lens motor.

In addition, in the interior construction of the projector 10, members that are heated to lower temperatures than the light source unit 63 are disposed within the inlet side space compartment 121. Specifically, disposed in the inlet side space compartment 121 are the light source control circuit board 102, the blower 110, the control circuit board 103, the image generation block 79 of the optical system unit 70, the projection side block 80 of the optical system unit 70 and the light guiding lens in the illumination side block 78 of the optical system unit 70.

On the other hand, disposed in the outlet side space compartment 122 are the light source unit 63 which is heated to relatively high temperatures, the light mixing unit 75 included in the illumination side block 78 of the optical system unit 70, and an outlet air temperature reducing unit 114.

Then, the light source unit 63 includes a luminescent wheel 71 for emitting light having wavelength bands of green and blue which are the primary colors of light by entering of light corresponding thereto, a wheel motor 73 which is a drive unit for driving to rotate the luminescent wheel 71, a primary light source 72 for emitting light of blue wavelength band on to the luminescent wheel 71, and a secondary light source 82 for emitting light of red wavelength band.

Then, the primary light source 72 is disposed so that an optical axis of the primary light source 72 is substantially at right angles to an optical axis of the light mixing unit 75. In addition, the secondary light source 82 is disposed so that an optical axis of the secondary light source 82 becomes substantially parallel to the optical axis of the light mixing unit 75. The luminescent wheel 71 is disposed in a position where the optical axis of the primary light source 72 intersects a wheel surface of the luminescent wheel 71 at right angles. In other words, a rotating axis of the wheel motor 73 for rotating the luminescent wheel 71 is parallel to the optical axis of the primary light source 72.

This primary light source 72 is designed to emit light on to a luminescent material layer 131 which is disposed in proximity to an outer circumferential portion of the luminescent wheel 71 and the diffuse layer 141. The primary light source 72 is configured as a laser emitter which emits light having a blue wavelength band which is visible light whose wavelength is shorter than that of light having a green wavelength band that is emitted from the luminescent material layer 131. In addition, the secondary light source 82 is configured as a red light emitting diode which emits light having a red wavelength band.

Figure 4A:
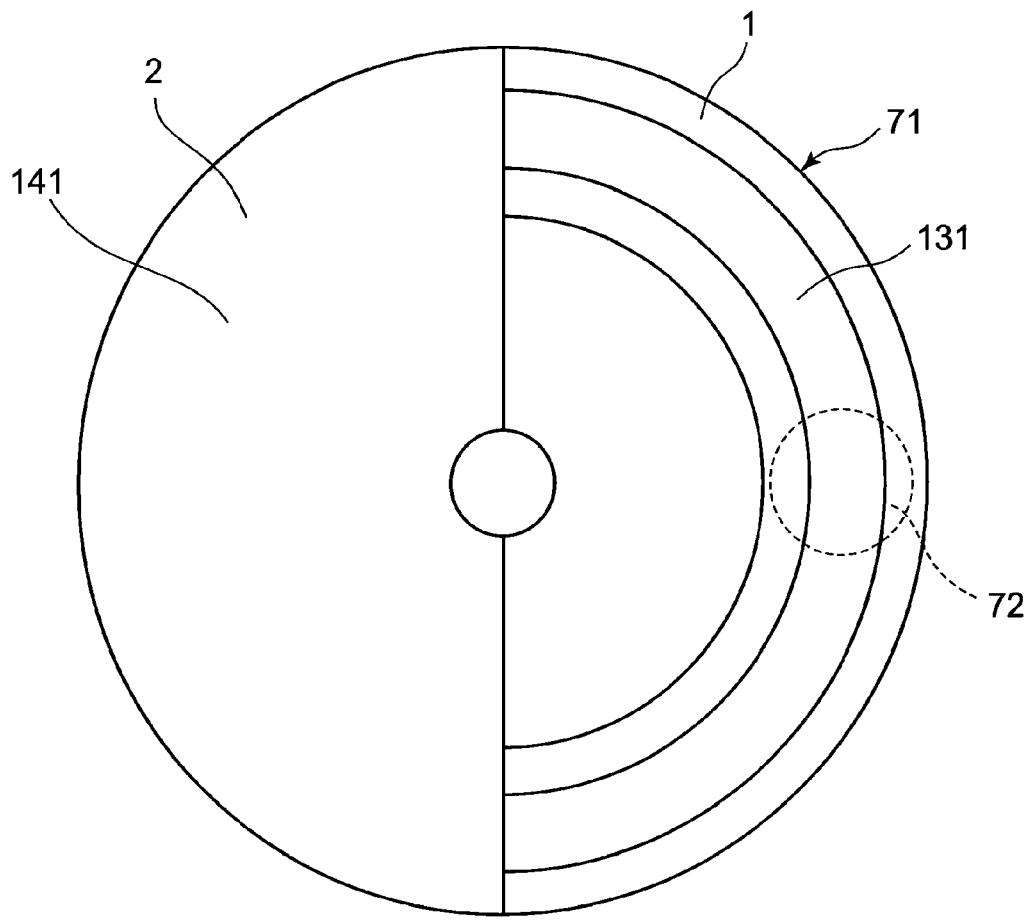
FIG. 4 shows an exemplary front view of a luminescent wheel according to the embodiment of the invention and an exemplary plan view of the luminescent wheel which is partially sectioned.
Figure 4B:
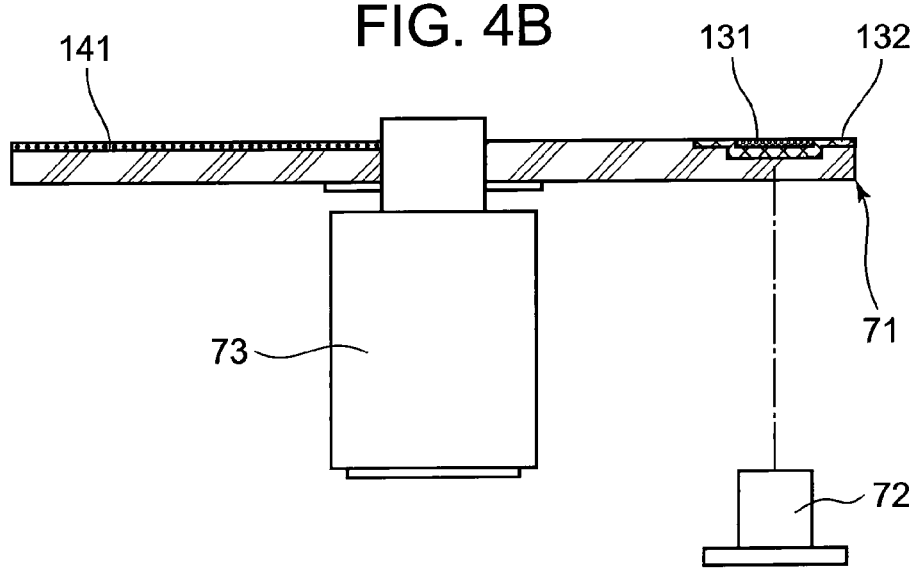

As is shown in FIG. 4, the luminescent wheel 71 is a thin circular transparent base material which includes the luminescent material layer 131. A circular opening is formed in a central portion of the transparent base material, and the circular opening so formed corresponds to a shape of a cylindrical rotating shaft which constitutes a connecting portion to the wheel motor 73. The rotating shaft is securely inserted into the circular opening and a motor hub is bonded to the transparent base material in a position lying in proximity to the central portion thereof, whereby the luminescent wheel 71 is strongly and rigidly connected to the rotating shaft of the wheel motor 73.

Consequently, this luminescent wheel 71 is able to rotate in a circumferential direction integrally by the wheel motor 73 as a driving unit which is controlled to be driven at a rotational speed of about 120 revolutions per second by the control unit 38 of the projector control means. Namely, the luminescent wheel 71 is designed to be controlled rotationally.

The transparent base material has two semicircular segment areas which lie adjacent to each other and is formed of a glass base material or a transparent resin base material. In this transparent base material, the luminescent material layer 131 is formed on a first area 1 which is one of the segment areas, while a transmissive portion is formed on a second area 2 which is the other segment area, and this transmissive portion is designed to transmit light from the primary light source 72.

Then, a belt-like recess portion is formed on the first area 1 of the transparent base material in a position lying in proximity to an outer circumferential portion thereof, and the luminescent material layer 131 is formed in the recess portion. This luminescent material layer 131 is a layer which contains a luminescent material which absorbs, when light enters there from the primary light source 72, the light from the primary light source 72 as excitation light to thereby be excited to emit light having a wavelength band of green which is one of the three primary color of light. By the luminescent material layer 131 being formed in the way described above, the luminescent wheel 71 can function as a light emitting plate. Note that this luminescent material layer 131 is made up of a crystal of luminescent material and a binder.

A dichroic layer 132 is formed through coating on a surface of the portion on the first area 1 of the transparent base material on which the luminescent material layer 131 is to be formed, and this dichroic layer 132 transmits excitation light and reflects light of other wavelength bands. The luminescent material layer 131 is formed on the dichroic layer 132. Note that the dichroic layer 132 may be formed not only at the portion where the luminescent material layer 131 is formed but also over an overall surface of the first area 1. In addition, since the dichroic layer 132 only has to be provided between the primary light source 72 and the luminescent material layer 131, the dichroic layer 132 may be formed on a side of the transparent base material which faces the primary light source 72.

The second area 2, which is the transmissive portion, has the diffuse layer 141 on a side thereof which is an opposite side to a side which faces the primary light source 72. Specifically, this diffuse layer 141 is formed as a layer which imparts a diffusing effect to light from the blue light source when the light is incident thereon by applying an optical treatment such as a roughening treatment to the second area 2 of the transparent base material through blasting.

In addition to the case where the diffuse layer 141 is formed by applying the optical treatment to the surface of the transparent base material, the diffuse layer 141 may be formed by securing a belt-like solid material which is an optical material to the specific side of the second area 2. In addition, the diffuse layer 141 may be formed on the side of the second area 2 which faces the primary light source 72 instead of the diffuse layer 141 being formed on the side of the second area 2 which lies opposite to the primary light source 72.

Further, a nonreflective coated layer, not shown, is formed over an overall surface of the primary light source 72 side of the transparent base material through coating.

In addition, in the luminescent wheel 71, the transparent base material can be formed of two filter pieces which correspond to the two segment areas. Namely, a configuration can be adopted in which the luminescent material layer 131 and the diffuse layer 141 are formed of the two filter pieces, respectively and thereafter, the two filter pieces are combined into a circular shape and are bonded together or are made integral with each other by means of an attaching member or the like.

In this way, the luminescent material layer 131 and the diffuse layer 141 are disposed on the two segment areas so as to lie adjacent to each other in a circumferential direction. Consequently, in the event that light from the blue light source is emitted sequentially on to the luminescent material layer 131 and the diffuse layer 141 on the luminescent wheel 71 which is rotating, when the light is emitted on to the luminescent material layer 131 of the luminescent wheel 71, luminescent light having a green wavelength band is emitted from the luminescent wheel 71. When the light is emitted on to the diffuse layer 141 of the transmissive portion of the luminescent wheel 71, the light from the blue light source is passed through the luminescent wheel 71 while being diffused.

Then, since the dichroic layer 132 is formed on the surface of the first area 1 of the transparent base material where the luminescent material layer 131 is disposed and the nonreflective coated layer is formed on the primary light source 72 side of the transparent base material, when light from the primary light source 72 is emitted on to the first area 1, the light from the blue light source passes through the nonreflective coated layer on the incident surface of the first area 1 so as to be incident on the transparent base material with almost no light being reflected to the primary light source 72 side. Then, the light from the blue light source which has passed through the transparent base material passes through the dichroic layer 132 to enter the luminescent material layer 131.

A luminescent material on the luminescent material layer 131 absorbs light from the blue light source as excitation light and then emits luminescent light having the green wavelength band in all directions. In the green luminescent light so emitted, the green luminescent light emitted in an opposite direction to the primary light source 72 is incident on the light mixing unit 75 via the light guiding optical system, which will be described later. The green luminescent light emitted towards the transparent base material side is reflected by the dichroic layer 132, and much of the reflected light is incident on the light mixing unit 75 via the light guiding optical system as light emitted from the luminescent wheel 71.

Then, when laser light having a blue wavelength band enters the diffuse layer 141 from the primary light source 72, since the diffuse layer 141 imparts the diffusing effect to the light of the blue light source incident thereon, blue light is emitted from the diffuse layer 141 which is made into diffuse light similar to the emitted light (the green luminescent light) from the luminescent material layer 131, and the blue light enters the light mixing unit 75 via the light guiding optical system.

Figure 5:
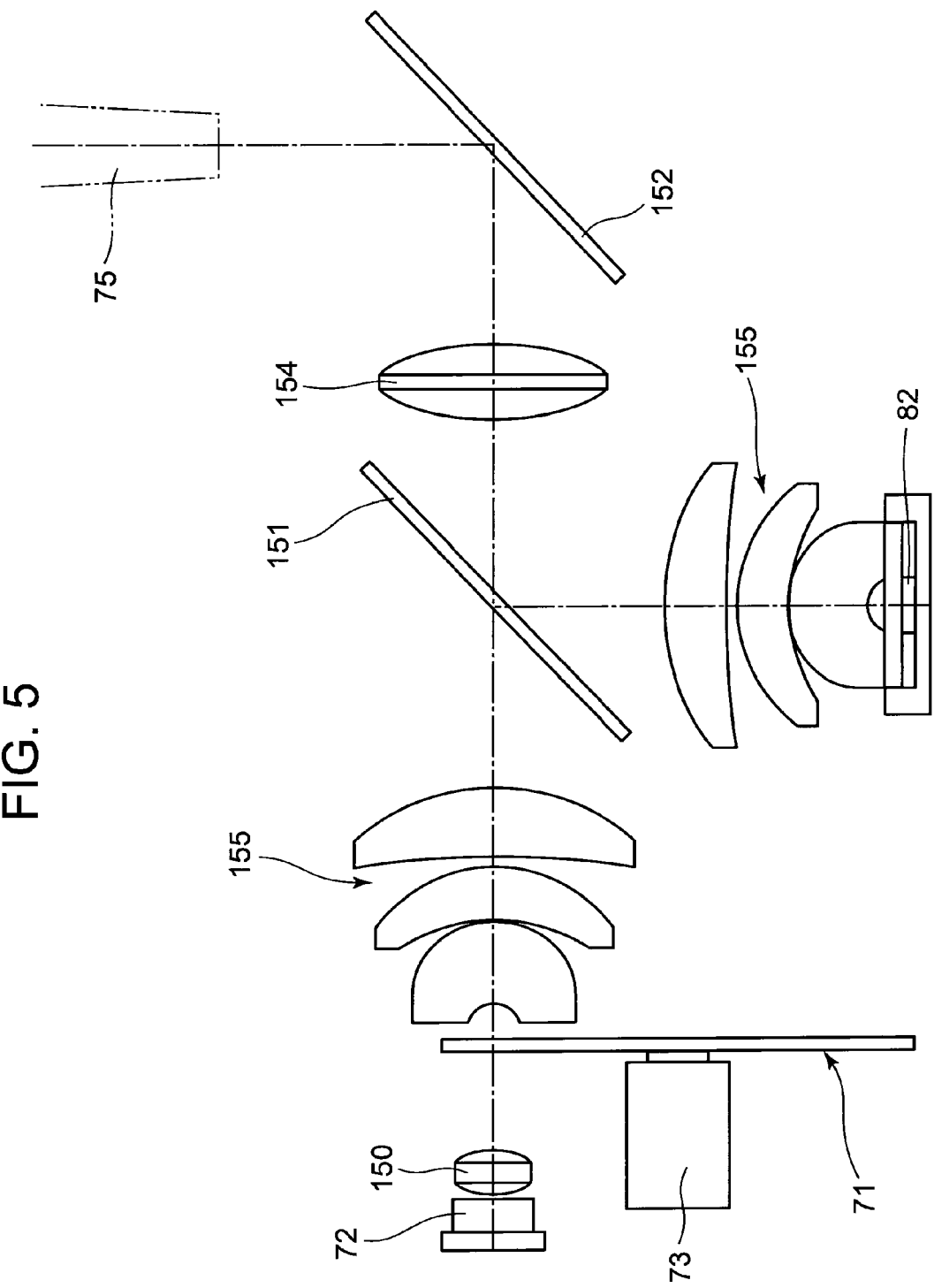
FIG. 5 is an exemplary plan view of the light source unit according to the embodiment of the invention.

In addition, as is shown in FIG. 5, the light source unit 63 includes a collimator lens 150. The collimator lens 150 is disposed on an exist side of the primary light source 72 so as to convert light emitted from the primary light source 72 into parallel light. Additionally, the light source unit 63 includes the light guiding optical system which is made up of a dichroic mirror 151 and a reflecting mirror 152, as well as a light guiding lens. The dichroic mirror 151 and the reflecting mirror 152 are designed so that light emitted from the luminescent wheel 71 which has a predetermined wavelength band is reflected thereon or passed therethrough and optical axes of blue light and green light from the luminescent wheel 71 and an optical axis of red light from the secondary light source 82 are changed in direction so as to be guided on the same optical path. The light guiding lens guides beams of light which are emitted from the luminescent wheel 71 so as to be incident on the light mixing unit 75.

Hereinafter, the light guiding optical system of the embodiment will be described.

The dichroic mirror 151 is disposed in a position where the optical axis of the primary light source 72 and the optical axis of the secondary light source 82 intersect each other at right angles. The dichroic mirror 151 transmits blue light that is emitted from the primary light source 72 and which passes through the transmissive portion of the luminescent wheel 71 and green light emitted from the luminescent wheel 71 and reflects red right emitted from the secondary light source 82 by changing the direction thereof at an angle of 90 degrees.

The reflecting mirror 152 is disposed in a position where the optical axis of the primary light source 72 intersects the optical axis of the light mixing unit 75 at right angles. The reflecting mirror 152 reflects blue light and green light from the luminescent wheel 71 and red light reflected by the dichroic mirror 151 by changing their directions at an angle of 90 degrees towards the light mixing unit 75.

By a light guiding lens group 155 being disposed in proximity to an exit plane of the luminescent wheel 71, beams of light emitted from the luminescent wheel 71 are guided so as to be shone on to the dichroic mirror 151.

Similarly, by a light guiding lens group 155 being disposed in proximity to an exit plane of the secondary light source 82, beams of light emitted from the secondary light source 82 are guided so as to be shone on to the dichroic mirror 151. Further, since a light mixing unit incident lens 154 is disposed between the dichroic mirror 151 and the reflecting mirror 152, respective beams of light of blue, green and red are incident on the light mixing unit 75 in the form of beams of light which are concentrated further.

Consequently, when the luminescent wheel 71 is rotated and light is emitted from the primary light source 72 and the secondary light source 82 at different timings, light having red, green and blue wavelength bands is sequentially incident on the light mixing unit 75 from the luminescent wheel 71 via the light guiding optical system, and the DMD, which is the display device 51 of the projector 10, time-shares light of red, green and blue in accordance with data for indication, whereby a color image can be generated on the screen.

Then, the turning on and off operations of the primary light source 72 and the secondary light source 82 are controlled to be time-shared by the light source control means. The light source control circuit 41, which is the light source control means, controls so that light is emitted from the primary light source 72 so as to enter one of the first area 1 and the second area 2 and so that the emission of light is stopped so as to prevent light from the primary light source 72 from entering a boundary position therebetween. Thus, by controlling the primary and secondary light sources in that way, the light source control circuit 41 controls so that the primary light source 72 is turned off and the secondary light source 82 is turned on so as to prevent the emission of light having a wavelength band which is a combination of wavelength bands of two colors from the luminescent wheel 71.

Specifically speaking, a range where the primary light source 72 is to be turned off is determined so that a substantially circular illumination area 7 illuminated by light from the primary light source 72 is positioned so as not to stretch over the first area 1 and the second area 2. This primary light source turning-off range is a range which is surrounded by tangents to an illumination area 7 illuminated by light from the luminescent wheel 71 which lies in proximity to one boundary of two boundaries between the first area 1 and the second area 2 as is shown in the figure. These tangents are imaginary lines which indicate a predetermined position on the luminescent wheel 71. The primary light source turning-off range is a fan-shaped area whose center angle centered at a boundary line between the first area 1 and the second area 2 is referred to as an acute angle, and when this area is positioned on an axis of the primary light source 72 which is disposed in a fixed position, the light source control means turns off the primary light source 72.

Namely, the light source control means turns off the primary light source 72 when one of the tangents forming the fan-shaped area comes to be positioned at the center of the illumination area 7 of the primary light source 72 which is disposed in the fixed position by the tangents moving as a result of the rotation of the luminescent wheel 71, and the light source control means turns on the primary light source 72 when the other tangent comes to be positioned at the center of the illumination area 7. In other words, the primary light source 72 is turned off when the boundary line moves to a position where it contacts the circular illumination area 7 as a result of rotation of the luminescent wheel 71, and the primary light source 72 is turned on when the boundary line passes the illumination area 7 and moves to a position where it contacts another illumination area 7.

Consequently, in order to prevent the mixing of colors in an ensured fashion, the light source control means turns off the primary light source 72 when the boundary between the first area 1 and the second area 2 of the luminescent wheel 71 which is rotating approaches the illumination area 7 of the primary light source 72 so that the primary light source 71 is turned off in a wider range than the primary light source turning-off range. Then, the light source control means turns on the primary light source 72 again when the boundary between the first area 1 and the second area 2 has passed through the illumination area 7 of the primary light source 72. As a result, the mixing of colors can be prevented at one of the two boundaries between the first area 1 and the second area 2.

Figure 6A:
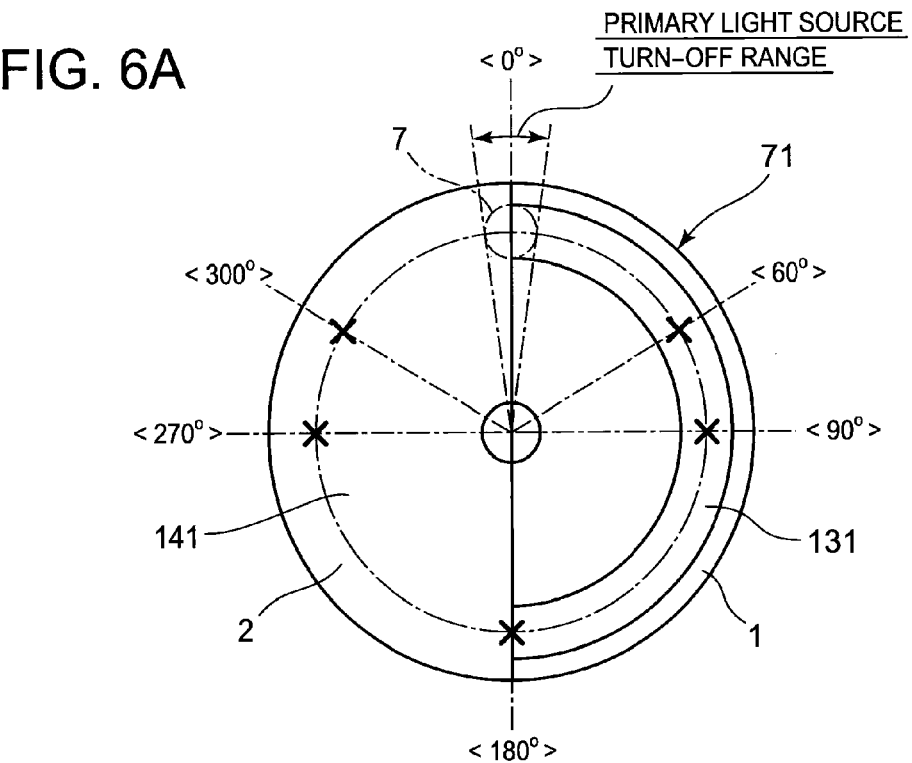
FIG. 6 shows exemplary front views of the luminescent wheel which show primary light source turn-off ranges according to the embodiment of the invention.
Figure 6B:
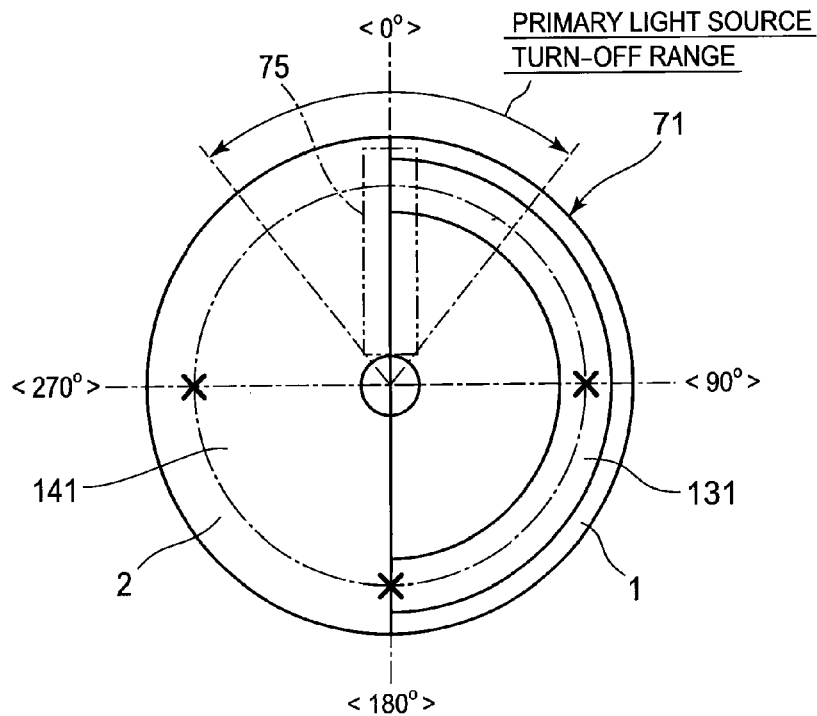

In addition, as is shown in FIG. 6(b), the range where the primary light source 72 is to be turned off can be set to be wider than a size of the incident plane of the light mixing unit 75, whereby the mixing of colors of light from the luminescent wheel 71 which is incident on the light mixing unit 75 in the range can be prevented in an ensured fashion, thereby making it possible to obtain good color reproducing characteristics.

Note that the primary light source turning-off range depicted in the figure may be configured as a range where the secondary light source 82 is turned on and the primary light source 72 is turned off so as to prevent the occurrence of mixing of colors at the other of the two boundaries between the two segment areas. However, the invention is not limited thereto, and hence, a configuration may be adopted in which the primary light source 72 is turned off and the secondary light source 82 is turned on so as to prevent the occurrence of mixing of colors at both the boundaries between the two segments, so that light of predetermined wavelength bands is emitted from the light source 63 sequentially in the order of red, green, red and blue, for example.

Next, timings at which the primary light source 72 and the secondary light source 82 are turned on and off will be described by reference to time charts shown in FIG. 7.

In the figure, a wheel angle represents a position on the wheel surface of the luminescent wheel 71 shown in FIG. 6 (specifically, a position on the wheel surface which is disposed at the center of the illumination area 7) in angle on the basis of understanding that one of the boundary lines between the first area 1 and the second area 2 is regarded as a reference (0 degree). This position moves as the luminescent wheel 71 rotates.

FIG. 7(a) is a drawing showing a control under which light of red, green and blue wavelength bands is emitted from the light source unit 63 at substantially equal intervals. Firstly, the light source control means turns on the primary light source 72 when a wheel position at a wheel angle of 60 degrees comes to be positioned at the center of the illumination area 7. Then, light emitted from the primary light source 72 enters the luminescent material layer 131 which is formed on the first area of the luminescent wheel 71. Because of this, green luminescent light (G) emitted from the luminescent wheel 71 is emitted from the light source unit 63 so as to be incident on the light mixing unit 75.

In addition, when the luminescent wheel 71 rotates further so that a wheel position at a wheel angle of 180 degrees reaches the center of the illumination area 7, light from the primary light source 72 enters the diffuse layer 141 on the second area 2. Then, light from the blue light source (B) that has passed through the transmissive portion of the luminescent wheel 71 while being diffused is emitted from the light source unit 63 so as to be incident on the light mixing unit 75.

Then, when a wheel position at a wheel angle of 300 degrees, which is a position lying just before the boundary between the first area 1 and the second area 2, comes to be positioned at the center of the illumination area 7 of the primary light source 72, the light source control means turns off the primary light source 72 and turns on the secondary light source 82. Then, only light from the red light source (R), which is emitted from the secondary light source 82, is emitted from the light source unit 63 so as to be incident on the light mixing unit 75.

Further, when the wheel position at the wheel angle of degrees comes to be positioned at the center of the illumination area 7 of the primary light source 72, the light source control means turns on the primary light source 72 and turns off the secondary light source 82. Then, green luminescent light (G) is emitted from the light source unit 63.

Consequently, since light having the red (R) wavelength band, light having the green (G) wavelength band and light having the blue (B) wavelength band are emitted sequentially from the light source unit 63, the projector 10 can generate a color image on the screen by time-sharing the light of the respective colors which has been incident in accordance with data at the display device 51 for display.

In addition, in order to prevent a reduction in luminance due to a state being produced in which neither the primary light source 72 nor the secondary light source 82 is turned on, the light source control means controls timings at which the primary light source 72 and the secondary light source 82 are turned on and off so that either of the primary light source 72 and the secondary light source 82 is turned on slightly before the other is turned off.

In addition, the secondary light source 82 which emits red light is installed as a single-color light source, and the primary light source 72 and the secondary light source 82 are made to be controlled individually by the light source control unit. Because of this, illumination times of the primary light source 72 and the secondary light source 82 can be changed as required, whereby the light source unit 63 can be provided as light source unit which has a variety of modes of different degrees of brightness.

Additionally, light having wavelength bands of magenta (M) and yellow (Y) which constitute complementary colors can be emitted from the light source unit 63 by turning on both the primary light source 72 and the secondary light source 82 simultaneously only for a predetermined length of time. Specifically speaking, as is shown in FIG. 7(b), when the primary light source 72 is turned on so as to cause light from the blue light source to enter the first area 1, green light (G) is emitted. Then, when the luminescent wheel 71 rotates whereby the light from the blue light source is caused to enter the second area 2, blue light (B) is emitted. Further, when the secondary light source 82 is turned on after blue light has been kept emitted for a predetermined length of time, blue light that has passed through the luminescent wheel 71 and red light emitted from the secondary light source 82 are combined together so that light having a stable wavelength band of magenta (M) can be emitted from the light source 63 so as to be incident on the light mixing unit 75.

Then, when only the primary light source 72 is turned off after the magenta light (M) has been kept emitted for a predetermined length of time, the red light (R) from the secondary light source 82 is emitted from the light source unit 63. Further, when the primary light source 72 is turned on without turning off the secondary light source 82 after red light (R) has been kept emitted for a predetermined length of time, red light from the secondary light source 82 and green light emitted from the luminescent wheel 71 are combined so that light having a stable wavelength band of yellow (Y) can be emitted from the light source 63 so as to be incident on the light mixing unit 75.

In this way, the light source control means not only controls to turn on the primary light source 72 and the secondary light source 82 individually separately but also controls to turn on the primary light source 72 and the secondary light source 82 simultaneously for the predetermined length of time at the predetermined timing so that light emitted from the luminescent wheel 71 when it receives light from the primary light source 72 and light emitted from the secondary light source 82 are combined together for the predetermined length of time. As a result, not only light of the primary colors but also light of the complementary colors can be emitted from the light source 63, whereby the luminance of the light source unit 63 can be increased so as to realize an increase in color reproducing characteristics.

In addition, as is shown in FIG. 7(c), the light source control means can control the time during which the primary light source 72 and the secondary light source 82 are turned on so that the emitting time of light of each color is reduced, thereby making it possible to control the luminance of the light source unit 63 as required. Additionally, by adopting a configuration in which the light source control means controls the primary light source 72 or the secondary light source 82 so as to suppress the output thereof only when light of a predetermined wavelength band is emitted, tone can be controlled.

Figure 8A:
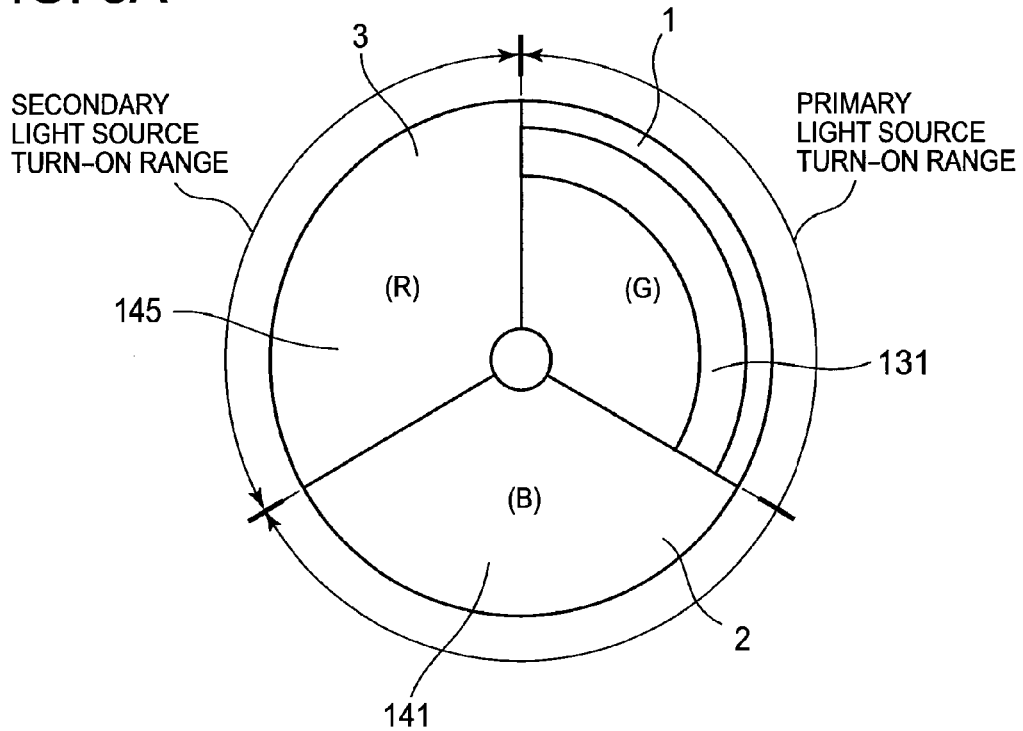
FIG. 8 shows exemplary front views of another form of a luminescent wheel in the light source unit according to the embodiment of the invention.

In addition, as is shown in FIGS. 4 and 6, the invention is not limited to the configuration in which the luminescent wheel 71 is formed to have the two segment areas but can adopt various configurations. For example, as is shown in FIG. 8(a), three segment areas are formed on a transparent base material. Then, a green luminescent material layer 131 for emitting green light (G) is disposed on a first area 1. A diffuse layer 141 for transmitting blue light (B) is disposed on a second area 2 to thereby form a transmissive portion. A mask 145 is disposed to cover a third area 3 to thereby form a non-transmissive portion which prevents the transmission of light from the primary light source 72.

In this way, by forming the non-transmissive portion which prevents the transmission of light from the primary light source 72 on the predetermined segment area and causing light of the secondary light source 82 to enter when light from the primary light source 72 is cut off by the non-transmissive portion, red light (R) of the secondary light source 82 can be emitted from the light source unit 63 while the primary light source 72 is kept turned on.

Figure 8B:
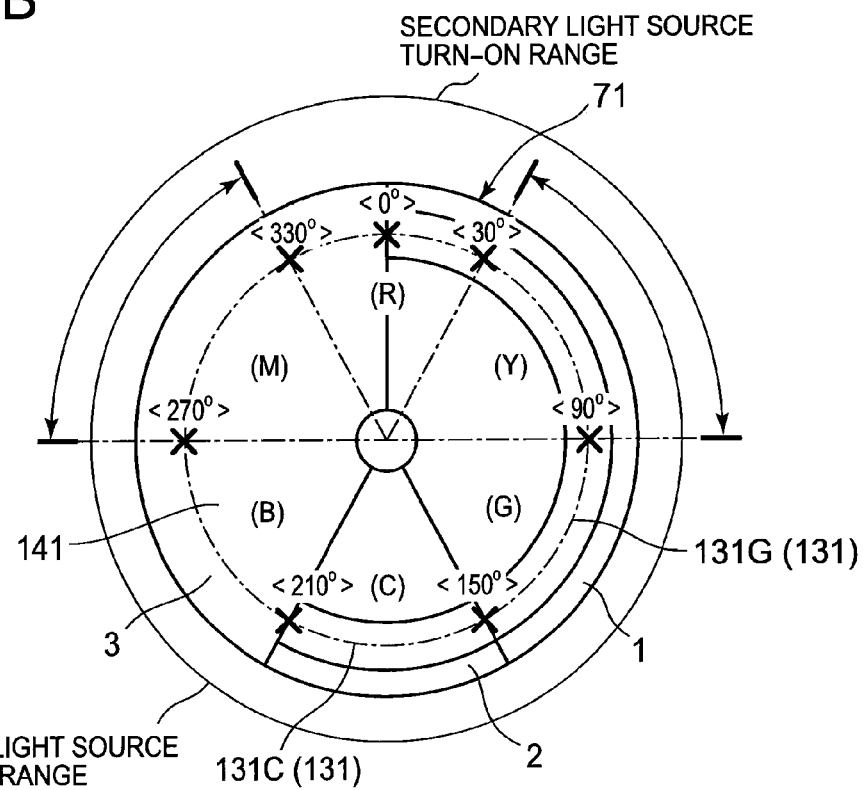

In addition, as is shown in FIG. 8(b), a configuration can also be adopted in which three segment areas are formed on a transparent base material and a green luminescent material layer 131G is disposed on a first area 1, a cyan luminescent material layer 131C is disposed on a second area 2 which can emit light having a wavelength band of cyan, which is a complementary color, and a third area 3 is formed as a diffuse and transmissive portion.

In this way, the luminescent material layer 131 does not have to be limited to the luminescent material layer which emits luminescent light having the green wavelength band. Thus, luminescent material layers which emit light of other various wavelength bands than the green wavelength band may be provided as the luminescent material layer 131. In addition, as is shown in FIG. 8(b), a primary light source turning-on range is set to range from a wheel angle of 30 degrees to a wheel angle of 330 degrees, and a secondary light source turning-on range is set to range from a wheel angle of 270 degrees to a wheel angle of 90 degrees. Thus, by adopting this configuration, only light having the red wavelength band (R) from the secondary light source 82 can be emitted from the light source unit 63 when the center of the illumination range of the primary light source 72 is positioned within the range from the wheel angle of 330 degrees to the wheel angle of 30 degrees.

Then, when the center of the illumination range is positioned in the range from the wheel angle of 30 degrees to the wheel angle of 90 degrees, light having a wavelength band of yellow (Y) can be emitted from the light source unit 63 which is a combination of light having the green wavelength band which is emitted from the luminescent wheel 71 and light having the red wavelength band which is emitted from the secondary light source 82. Additionally, when the center of the illumination range is positioned in a range from the wheel angle of 90 degrees to a wheel angle of 150 degrees, only light having the green wavelength band (G) which is emitted from the luminescent wheel 71 can be emitted from the light source unit 63.

Further, when the center of the illumination range is positioned in a range from the wheel angle of 150 degrees to a wheel angle of 210 degrees, only light having the cyan wavelength band (C) which is emitted from the luminescent wheel 71 is emitted from the light source unit 63. In addition, when the center of the illumination range is positioned in a range from the wheel angle of 210 degrees to the wheel angle of 270 degrees, only light having the blue wavelength band (B) which passes through the transmissive portion of the luminescent wheel 71 is emitted from the light source unit 63.

Then, when the center of the illumination range is positioned in a range from the wheel angle of 270 degrees to the wheel angle of 330 degrees, light having a wavelength band of magenta (M) is emitted from the light source unit 63 which is a combination of light having the blue wavelength band which passes through the transmissive portion of the luminescent wheel 71 and light having the red wavelength band which is emitted from the secondary light source 82.

In this way, there can be provided the light source unit 63 which can emit light of various wavelength bands by disposing the different types of luminescent material layers 131 or controlling the timings at which the primary light source 72 and the secondary light source 82 are turned on by combining the timings variously.

Then, the types and locations of the light sources are not limited to those of the embodiment described heretofore. Therefore, in place of the laser emitter, a blue light emitting diode may be used as the primary light source 72. A laser emitter which emits laser light of the red wavelength band may be adopted for the secondary light source 82. In addition, high-output excitation light can be emitted so as to excite the luminescent material with good efficiency by adopting the blue laser emitter for the primary light source 72, and the production costs can be suppressed by adopting a red light emitting diode for the secondary light source 82.

Further, the invention is not limited to the optical layout shown in FIG. 5 which is configured so that light emitted from the secondary light source 82 is prevented from entering the luminescent wheel 71. Thus, an optical layout shown in FIG. 9 may be adopted in which a secondary light source 82 is disposed on the side where a primary light source 72 is disposed so that light from the secondary light source 82 also enters a luminescent wheel 71. As this occurs, a dichroic mirror 151 is installed in a position which lies between the luminescent wheel 71 and the primary light source 72 and where an optical axis of the primary light source 72 and an optical axis of the secondary light source 82 intersect each other at right angles. The dichroic mirror 151 is designed to transmit light from the primary light source 72 and to reflect light from the secondary light source 82. Namely, light from the secondary light source 82 can also enter the luminescent wheel 71.

Figure 10:
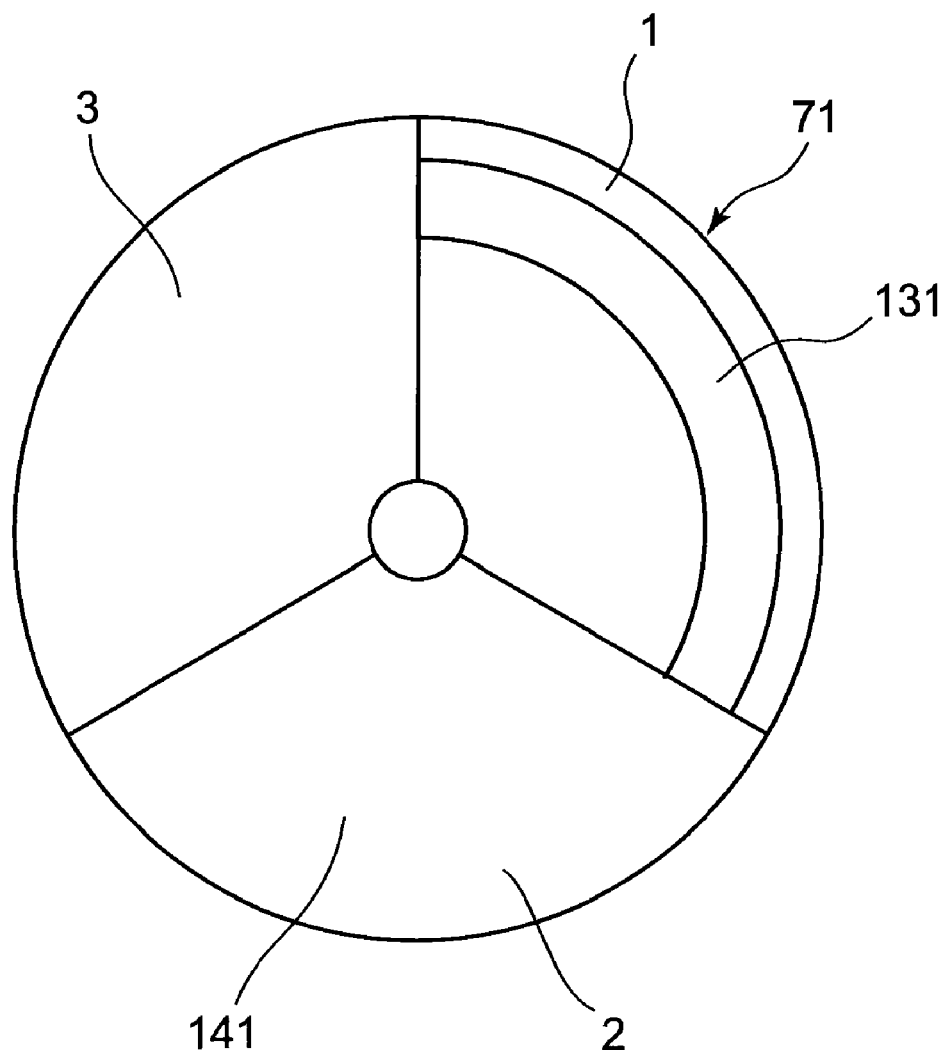
FIG. 10 is an exemplary front view of a luminescent wheel of the light source unit according to the modified example of the invention.

In addition, as this configuration is adopted, as is shown in FIG. 10, the luminescent wheel 71 has a first area 1, a second area 2 and a third area 3. Specifically, the first area 1 has a luminescent material layer 131 which receives light from the primary light source 72 to emit luminescent light. The second area 2 functions as a transmissive portion with a diffuse layer 141 which transmits light from the primary light source 72. The third area 3 functions as a transmissive portion which transmits light from the secondary light source 82. Then, by turning on the primary light source 72 (while turning off the secondary light source 82) so that light enters the first area 1 and the second area 2 and turning on the secondary light source 82 (while turning off the primary light source 72) so that light enters the third area 3, light of the respective colors can be emitted sequentially from the light source unit 63.

In the event that the secondary light source 82 is made up of a laser emitter, by forming a diffuse layer 141 on the second area 2 and the third area 3, highly directive laser light emitted from the primary light source 72 and the secondary light source 82 can be passed therethrough as diffuse light which is similar to luminescent light emitted from the first area 1. Then, as this occurs, the diffuse layers 141 disposed on the second area 2 and the third area 3 are formed in accordance with characteristics of light caused to enter, and optical treatments of different specifications may be applied to the diffuse layers 141.

In addition, a configuration may be adopted in which in place of disposing the diffuse layers 141 on the transmissive portions of the luminescent wheel 71, the transmissive portions are formed of a normal glass plate or as space in the form of a through hole on the perimeter of which a frame is formed, and optical components which impart a diffuse effect are fixedly disposed on an optical path of laser light on the primary light source 72 side in close proximity to the luminescent wheel 71 or on an exit side of the luminescent wheel 71. In addition, in the event that the primary light source 72 and the secondary light source 82 are each made of a light emitting diode, the light source unit 63 may adopt a configuration in which the diffuse layer 141 is provided on neither the transmissive portion nor the optical path.

In this way, according to the invention, due to the light source unit 63 including the primary light source 72 which excites the luminescent material, the luminescent wheel 71 having the type of luminescent material with good light emitting efficiency and the secondary light source 82 which is the single-color light source for emitting light of the red wavelength band which corresponds to a luminescent material with relatively low light emitting efficiency in place of forming, for example, a red luminescent material on the luminescent wheel 71 as the luminescent material with relatively low light emitting efficiency, there can be provided the light source unit 63 which can increase the luminance of the screen of the projector 10 and the projector 10 which includes the light source unit 63.

In addition, since the configuration is adopted in which light from the light source is caused to enter the luminescent wheel 71 at the predetermined timing, compared with a case in which light is caused to strike the luminescent wheel 71 at all times, the time during which light is shone on to the luminescent wheel 71 can be reduced so as to suppress the increase in temperature. Consequently, a reduction in light emitting efficiency can be suppressed which is attributed to an increase in temperature of the luminescent material, thereby making it possible to increase the light emitting efficiency of the luminescent material.

Additionally, by adopting the laser emitter which emits light of the blue wavelength band for the primary light source 72, the luminescent material can be excited with good efficiency for emission of light. In addition, by forming at least the luminescent material layer 131 having the luminescent material for emitting light of the green wavelength band on the luminescent wheel 71, light having the wavelength band of green which is one of the primary colors of light can be generated. Further, by providing the diffuse layer 141 on the transmissive portion, laser light having directivity can be transmitted while being diffused so that light of the wavelength band of blue which is another of the three primary colors of light can be incident on the light mixing unit 75 as diffuse light similar to luminescent light.

In addition, the invention is not limited to the embodiment and its modified examples. For example, in place of being provided on the projector 10, the light source control means may be provided separately for the light source unit 63. In addition, an optical layout may be adopted in which the dichroic mirror 151 shown in FIG. 5 is made into a mirror having such characteristics that light from the luminescent wheel 71 is reflected and light from the secondary light source 82 is passed therethrough and the light mixing unit 75 is disposed on the optical axis of the secondary light source 82. Additionally, an optical layout may also be adopted in which the dichroic mirror 151 shown in FIG. 9 is made into a mirror having such characteristics that light from the primary light source 72 is reflected and light from the secondary light source 82 is passed therethrough and the positions of the primary light source 72 and the secondary light source 82 are replaced by each other.

In addition, in the embodiment, while the laser emitter which emits light of the blue wavelength band is described as being used for the primary light source 72, the invention is not limited thereto. For example, a laser emitter which emits light having a wavelength band of ultraviolet light may be used for the primary light source 72. As this occurs, a luminescent material layer is desirably disposed on the transmissive portion of the luminescent wheel 71 which emits light having a different wavelength band from light having a wavelength band which is emitted by a luminescent material layer 131 which is formed on a reflective portion.

Additionally, in the embodiment, while the dichroic mirror is used for changing the directions of the optical paths and selecting transmission or reflection in accordance with wavelengths, the invention is not limited thereto. For example, the dichroic mirror may be replaced by other alternative means such as a dichroic prism.

Figure 9:
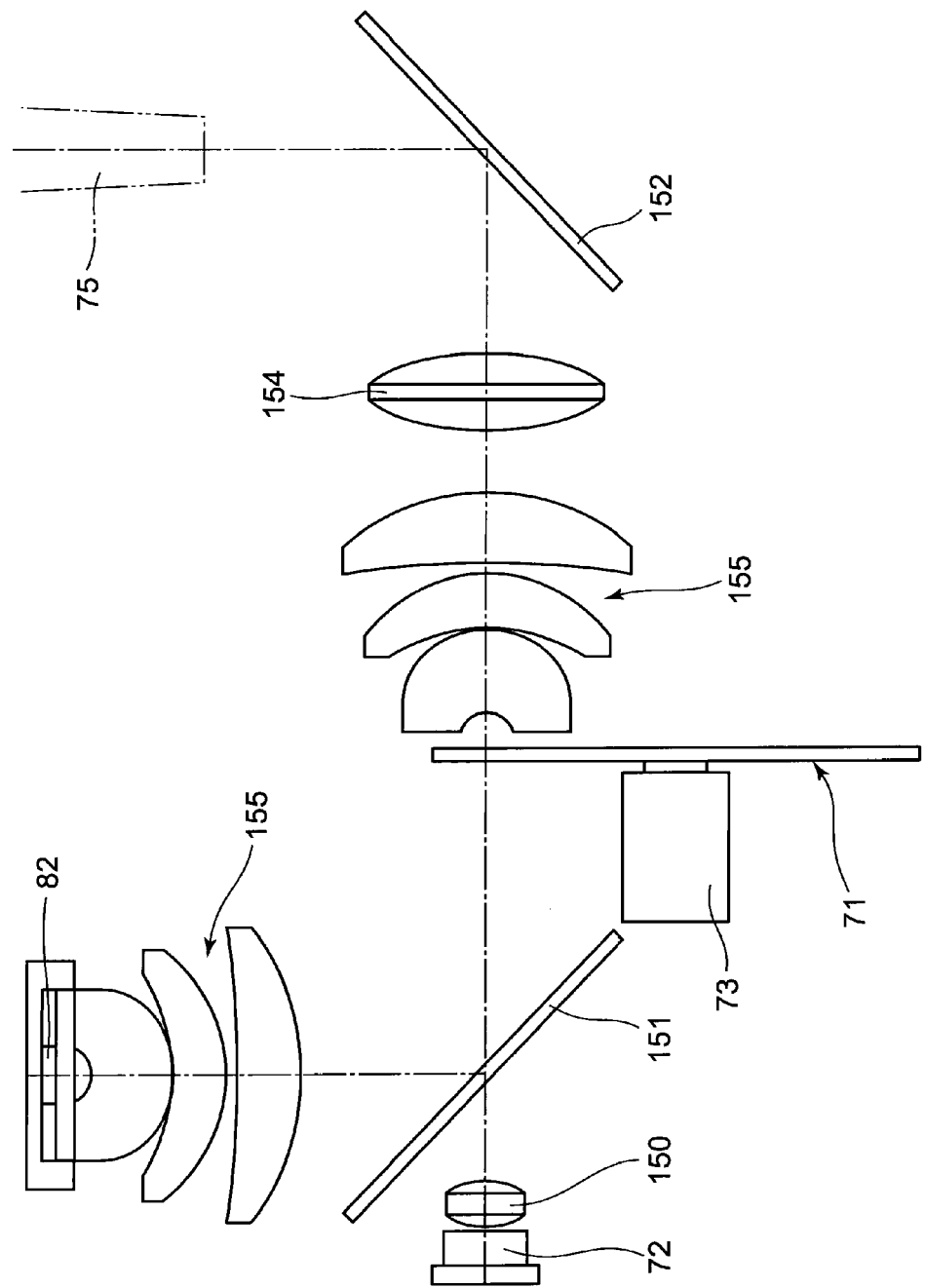
FIG. 9 is an exemplary plan view of a light source unit according to a modified example of the invention.

In this way, as is shown in FIGS. 5 and 9, since the light source unit 63 can adopt the various optical layouts, not only can the luminance of the screen of the projector 10 be increased as has been described above, but also the degree of freedom can be increased in disposing the light source unit 63 in electric or electronic equipment such as the projector 10 in which the light source unit 63 is installed.

Further, as to the segment areas formed on the transparent base material, the invention is not limited to the configuration in which the segment areas are formed equal in size. Therefore, there may be a configuration in which four or more segment areas are formed although those are not equal in size. In addition, a configuration may be adopted in which a luminescent material layer 131 which emits light of the red wavelength band is disposed on the third area 3 shown in FIG. 10 and when the third area 3 is positioned at the center of the illumination range, both the primary light source 72 and the secondary light source 82 are turned on so as to make use of the secondary light source 82 as an auxiliary light source for increasing the quantity of red light. Additionally, the secondary light source 82 is not limited in use to the light source which emits light of the red wavelength band but may be used as a light source for emitting light of any wavelength band other than red wavelength band which differs from luminescent light emitted from the luminescent material layer 131 and excitation light emitted from the primary light source 72.

Further, there may be a case where the luminescent wheel 71 is formed into a rectangular light emitting plate in place of being formed into the disc shape and is disposed fixedly. As this occurs, by installing an adjusting unit for changing the emitting direction of light from the primary light source 72 between the primary light source 72 and the light emitting plate or providing a light source driving unit for driving the primary light source 72 so as to change its position and or light emitting direction, so that an illumination spot of light from the primary light source 72 is positioned sequentially in the respective segment areas, light of the respective colors can be incident on the light mixing unit 75 via the light guiding optical system. In addition, as the adjusting unit, for example, an optical deflector can be adopted which utilizes a KTN crystal, an acousto-optic device, an MEMS mirror or the like.

In addition, the invention is not limited to the embodiment and its modified examples and hence can be modified and improved as required without departing from the spirit and scope thereof.

While the invention has been described by reference to the various typical embodiments, the invention is not limited thereto. Consequently, the scope of the invention is only limited by claims appended hereto.

21 Input/Output Connector Part
22 Input/Output Interface
23 Image Transform Part
24 Display Encoder
25 Video RAM
26 Display Drive part
31 Image Compression/Expansion Part
32 Memory Card
35 Ir Reception Part
36 IR Processing Part
37 Keys/Indicators Part
38 Control Unit
41 Light Source Control Circuit
43 Cooling Fan Drive Control Circuit
47 Audio Processing Part

What is claimed is:

1. A light source unit comprising:
a light emitting plate which has a plurality of segment areas and in which a luminescent material layer which emits light having a predetermined wavelength band by receiving excitation light and a transmissive portion which transmits light are formed respectively on at least the plurality of segment areas;
a primary light source for emitting the excitation light onto the luminescent material layer;
a secondary light source for emitting light having a wavelength band which differs from wavelength bands of the luminescent light emitted from the luminescent material layer and the excitation light emitted from the primary light source;
a light guiding optical system for guiding light emitted from the light emitting plate and the light emitted from the secondary light source to a same optical path; and
a light source controller for controlling emission of light from the primary light source and the secondary light source;
wherein:
the primary light source is a laser emitter which emits laser light having a wavelength band of blue;
the luminescent material layer comprises a luminescent material which emits at least light having a wavelength band of green by receiving the excitation light;
the light emitting plate is a luminescent wheel which comprises a base material whose rotation can be controlled;
the light source controller is configured to perform control to turn off the primary light source and to perform control to turn on the secondary light source so as to prevent the light from the primary light source from being emitted onto at least one boundary of the segment areas which are adjacent to each other;
the base material has two segment areas which are adjacent to each other, the luminescent material layer is formed on one of the segment areas, and the other segment area comprises the transmissive portion;
the light source controller is configured to perform control to turn off the primary light source and to perform control to turn on the secondary light source at a position where an illumination area stretches over the two segment areas so that the light source controller prevents a combination of wavelength bands of two colors from being emitted from the light emitting plate by emission of the light from the primary light source onto at least one boundary of the two segment areas; and
a primary light source turning-off range controlled by the light source controller is a fan-shaped area whose center angle centered at a boundary line between the two segment areas is an acute angle, and the primary light source is turned off when either one of lines which connect a center of the luminescent wheel and tangents to an outer circumference of a substantially circular illumination area of the light from the primary light source comes to be positioned at the boundary of the two segment areas.

2. A light source unit as set forth in claim 1, wherein a diffuse layer which diffuses the light from the primary light source is formed on the transmissive portion of the light emitting plate.

3. A light source unit as set forth in claim 2, wherein the secondary light source is a light emitting diode which emits light having a wavelength band of red.

4. A light source unit as set forth in claim 3, wherein:
the base material is a transparent base material; and
a dichroic layer is formed on a surface of the segment area of the transparent base material on which the luminescent material layer is disposed, the dichroic layer being adapted to transmit the excitation light and reflect light having other wavelength bands.

5. A light source unit as set forth in claim 4, wherein a dichroic mirror is disposed in a position where an optical axis of the primary light source and an optical axis of the secondary light source intersect each other at right angles, the dichroic mirror being adapted to transmit the light from the light emitting plate and reflect the light from the secondary light source or adapted to reflect the light from the light emitting plate and transmit the light from the secondary light source; and wherein the light emitted from the secondary light source is prevented from entering the light emitting plate.

6. A light source unit as set forth in claim 5, wherein the light source controller is configured to perform control to turn on the primary light source and the secondary light source individually separately, and to perform control to turn on the primary light source and the secondary light source simultaneously so that the light emitted from the light emitting plate by receiving the light from the primary light source and the light emitted from the secondary light source are combined together only for a predetermined length of time.

7. A projector comprising:
the light source unit set forth in claim 6;
a display device;
a light source side optical system for guiding light from the light source unit to the display device;
a projection side optical system for projecting an image emitted from the display device onto a screen; and
a projector controller for controlling the light source unit and the display device.

8. A projector comprising:
the light source unit set forth in claim 5;
a display device;
a light source side optical system for guiding light from the light source unit to the display device;
a projection side optical system for projecting an image emitted from the display device onto a screen; and
a projector controller for controlling the light source unit and the display device.

9. A light source unit as set forth in claim 3, wherein a dichroic mirror is disposed in a position where an optical axis of the primary light source and an optical axis of the secondary light source intersect each other at right angles, the dichroic mirror being adapted to transmit the light from the light emitting plate and reflect the light from the secondary light source or adapted to reflect the light from the light emitting plate and transmit the light from the secondary light source; and wherein the light emitted from the secondary light source is prevented from entering the light emitting plate.

10. A light source unit as set forth in claim 9, wherein the light source controller is configured to perform control to turn on the primary light source and the secondary light source individually separately, and to perform control to turn on the primary light source and the secondary light source simultaneously so that the light emitted from the light emitting plate by receiving the light from the primary light source and the light emitted from the secondary light source are combined together only for a predetermined length of time.

11. A light source unit as set forth in claim 3, wherein a dichroic mirror is disposed in a position where an optical axis of the primary light source and an optical axis of the secondary light source intersect each other at right angles, the dichroic mirror being adapted to transmit the light from the primary light source and reflect the light from the secondary light source or adapted to reflect the light from the primary light source and transmit the light from the secondary light source; and wherein the light from the secondary light source is made to pass through the transmissive portion of the light emitting plate.

12. A projector comprising:
the light source unit set forth in claim 3;
a display device;
a light source side optical system for guiding light from the light source unit to the display device;
a projection side optical system for projecting an image emitted from the display device onto a screen; and
a projector controller for controlling the light source unit and the display device.

13. A light source unit as set forth in claim 1, wherein another luminescent material layer is formed on the transmissive portion of the light emitting plate, and the another luminescent material layer emits light having a wavelength band which is different from the light having the predetermined wavelength band which the luminescent material layer emits by receiving the excitation light from the primary light source.

14. A light source unit as set forth in claim 1, wherein the secondary light source is a light emitting diode which emits light having a wavelength band of red.

15. A light source unit as set forth in claim 1, wherein:
the base material is a transparent base material; and
a dichroic layer is formed on a surface of the segment area of the transparent base material on which the luminescent material layer is disposed, the dichroic layer being adapted to transmit the excitation light and reflect light having other wavelength bands.

16. A light source unit as set forth in claim 1, wherein a dichroic mirror is disposed in a position where an optical axis of the primary light source and an optical axis of the secondary light source intersect each other at right angles, the dichroic mirror being adapted to transmit the light from the light emitting plate and reflect the light from the secondary light source or adapted to reflect the light from the light emitting plate and transmit the light from the secondary light source; and wherein the light emitted from the secondary light source is prevented from entering the light emitting plate.

17. A light source unit as set forth in claim 16, wherein the light source controller is configured to perform control to turn on the primary light source and the secondary light source individually separately, and to perform control to turn on the primary light source and the secondary light source simultaneously so that the light emitted from the light emitting plate by receiving the light from the primary light source and the light emitted from the secondary light source are combined together only for a predetermined length of time.

18. A projector comprising:
the light source unit set forth in claim 17;
a display device;
a light source side optical system for guiding light from the light source unit to the display device;
a projection side optical system for projecting an image emitted from the display device onto a screen; and
a projector controller for controlling the light source unit and the display device.

19. A light source unit as set forth in claim 1, wherein a dichroic mirror is disposed in a position where an optical axis of the primary light source and an optical axis of the secondary light source intersect each other at right angles, the dichroic mirror being adapted to transmit the light from the primary light source and reflect the light from the secondary light source or adapted to reflect the light from the primary light source and transmit the light from the secondary light source; and wherein the light from the secondary light source is made to pass through the transmissive portion of the light emitting plate.

20. A projector comprising:

the light source unit set forth in claim 1;

a display device;

a light source side optical system for guiding light from the light source unit to the display device;

a projection side optical system for projecting an image emitted from the display device onto a screen; and a projector controller for controlling the light source unit and the display device.

* * * * *